United States Patent [19]
Benton et al.

[11] Patent Number: 5,411,579
[45] Date of Patent: May 2, 1995

[54] AUTO FILTER CURB

[76] Inventors: Russell R. Benton; Elbert L. McGarr, Jr., both of P.O. Box 757, East Tallassee, Ala. 36023

[21] Appl. No.: 98,096

[22] Filed: Jul. 28, 1993

[51] Int. Cl.⁶ .......................................... B01D 46/18
[52] U.S. Cl. ........................................ 95/277; 55/290; 55/354
[58] Field of Search .............. 95/273, 277; 55/290, 55/294, 351–354

[56] References Cited

U.S. PATENT DOCUMENTS

| | | | |
|---|---|---|---|
| 395,801 | 1/1889 | Weeks | 55/290 |
| 1,814,428 | 7/1931 | Bishop | 55/351 X |
| 2,463,723 | 3/1949 | Spraragen | 55/354 |
| 3,280,538 | 10/1966 | Schwarz | 55/354 |
| 3,368,333 | 2/1968 | Merklin | 55/354 |
| 3,375,638 | 4/1968 | Dungler | 55/351 X |
| 4,221,576 | 9/1980 | Phillips, Jr. | 55/352 |
| 4,521,230 | 6/1985 | Strong | 55/351 X |
| 4,894,071 | 1/1990 | Klein | 55/351 X |

FOREIGN PATENT DOCUMENTS 2160980  6/1973  Germany ................ 55/354

*Primary Examiner*—Robert Spitzer

[57] ABSTRACT

This invention relates to a method and apparatus for the rooftop support of an airconditioning unit and for the automatic continuous cleaning of the treated air that circulates through the supported air conditioning unit, thus an Auto Filter Curb. The unique design of the system places the automatically rolled filter inside the plenum curb and within the return air stream to protect the evaporator coil from the accumulation of lent and dust, thus helping to prevent the compressors from overheating, and consequently reduce maintenance costs.

2 Claims, 3 Drawing Sheets

AUTO FILTER CURB

BACKGROUND OF THE INVENTION

The trend in business and industry over the last several years has been toward housing said business or industry in much larger buildings, such as Wal-mart, K-mart, shopping centers, carpet mills and etc. Placing airconditioning units on the rooftop of such buildings is a very successful and convenient method of supplying conditioned air to such a facility, however these airconditioning units are subjected to continuous abuse by the load of work required and consequently need as much protection as possible. This invention contributes to the elimination of some of the airconditioning compressors from over heating, as the return air stream is filtered prior to its passing over the evaporator coils, thus preventing lent and dust buildup and reducing maintenance costs.

SUMMARY OF THE INVENTION

The purpose of this invention is to provide a method and apparatus for supporting rooftop airconditioning units and automatically cleaning the return air stream of conditioned air prior to its passing through said air conditioning unit, thus offering protection to the unit's compressors.

Various other features of the method and apparatus of the present invention will become obvious to those skilled in the art upon reading the disclosure set forth hereinafter.

BRIEF DESCRIPTION OF DRAWINGS

Referring now to the drawings, the apparatus is shown in isometric views and end views of the automatic roller system.

DETAILED DESCRIPTION

Figure 1:
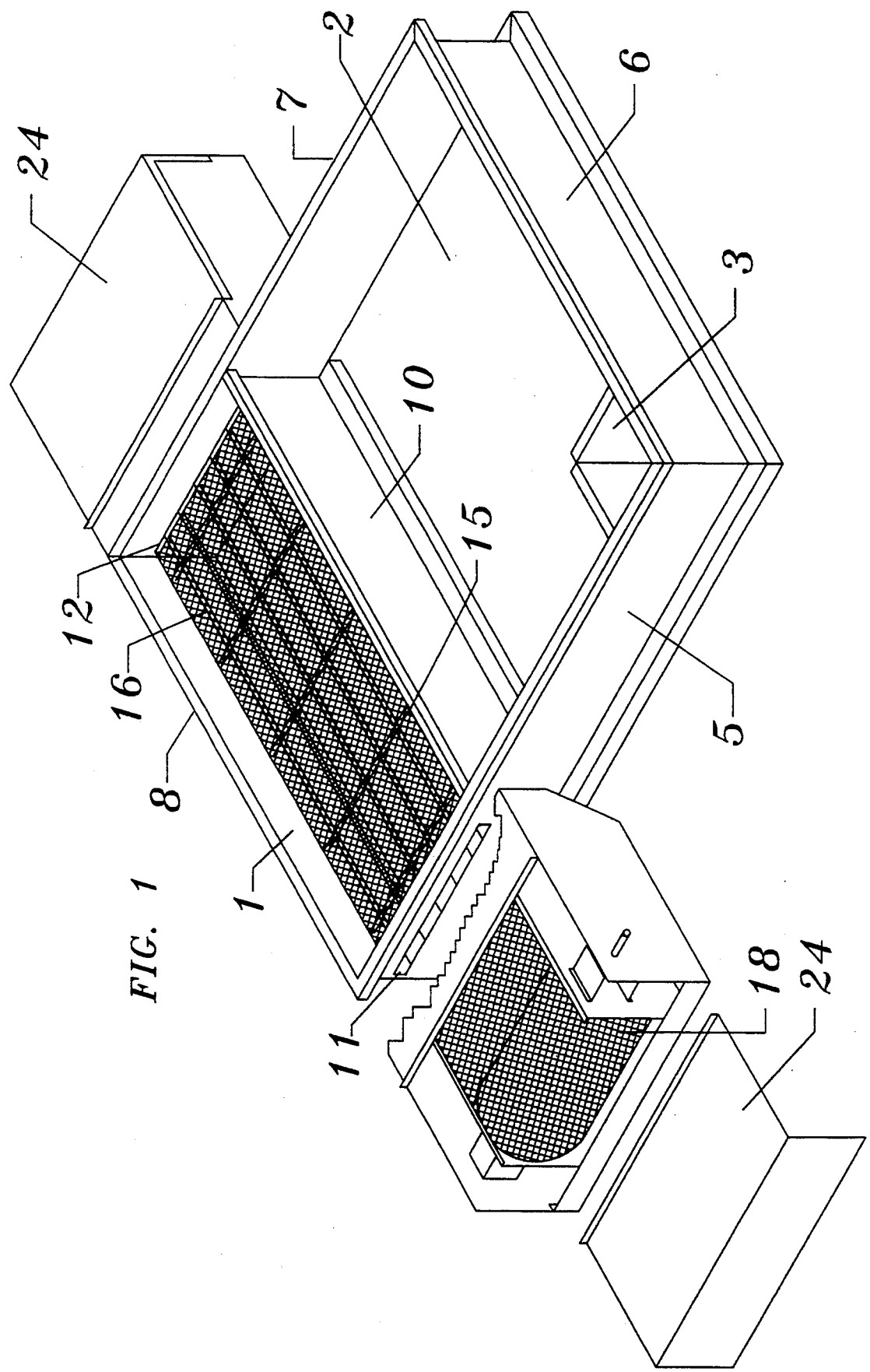
FIG. 1 illustrates a cut-a-way view of the apparatus as it is positioned to receive an airconditioning rooftop unit.
Figure 6:
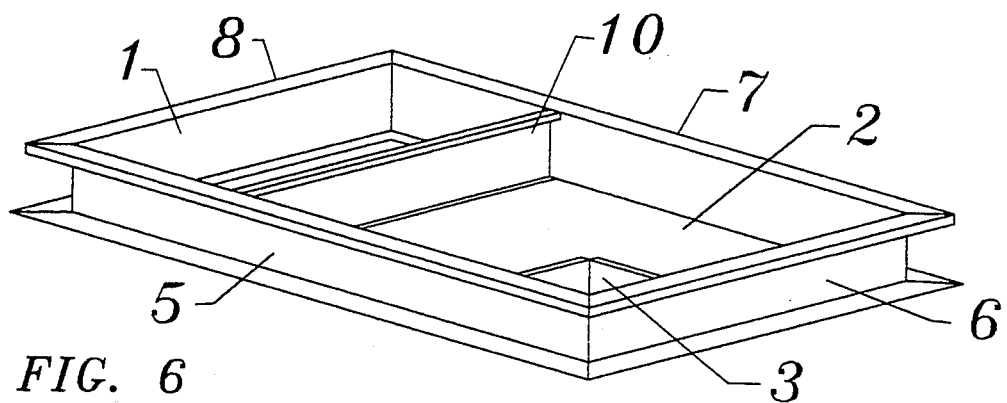
FIG. 6 illustrates the quadrilaterally shaped Curb without the Auto Filter unit.

Referring now to FIG. 1, there is illustrated the apparatus showing the cut-a-way top exposed view of the Auto Filter Curb prior to installing a rooftop air conditioning unit on said apparatus. The rectangular shaped rigid partition 5, FIGS. 1 and 6, is positioned horizontally on its edge with its width extending up in a vertical position. At least three other selectively shaped rigid partitions, 6, 7, and 8 are selectively positioned horizontally on edge with each having its width extending up in a vertical position and with each having its ends selectively connected in series with each adjoining selected partition, to form a quadrilaterally shaped apparatus. At least one selected rigid partition 10 is positioned within said quadrilaterally shaped apparatus with its length selectively positioned horizontally and its width extending up vertically and having its ends connected at selected locations to the inside walls of said apparatus, which divides the quadrilaterally shaped apparatus into at least two separate compartments 1 and 2, see FIGS. 1 and 6. At least two selectively sized, rectangular, parallel slots 11 and 12 are installed at selected locations through opposite outer walls of a selected compartment of said apparatus, shown in FIG. 1. Compartment 1 is shown to contain the two parallel slots. Grating 15, of selected mesh to allow air free passage and rigid to support filter material, is shown installed across compartment 1 and extending from the base of slot 11 across to the base of slot 12. Grating 16, of selected mesh to allow air free passage and rigid to hold filter material in place, is shown installed over and parallel to grating 15 and extending across from the top of slot 11 to the top of slot 12, with the two parallel gratings having means of support, which allows selected air space to exist between gratings 15 and 16, said air space providing a passageway for the filter material to pass between said gratings 15 and 16.

Figure 2:
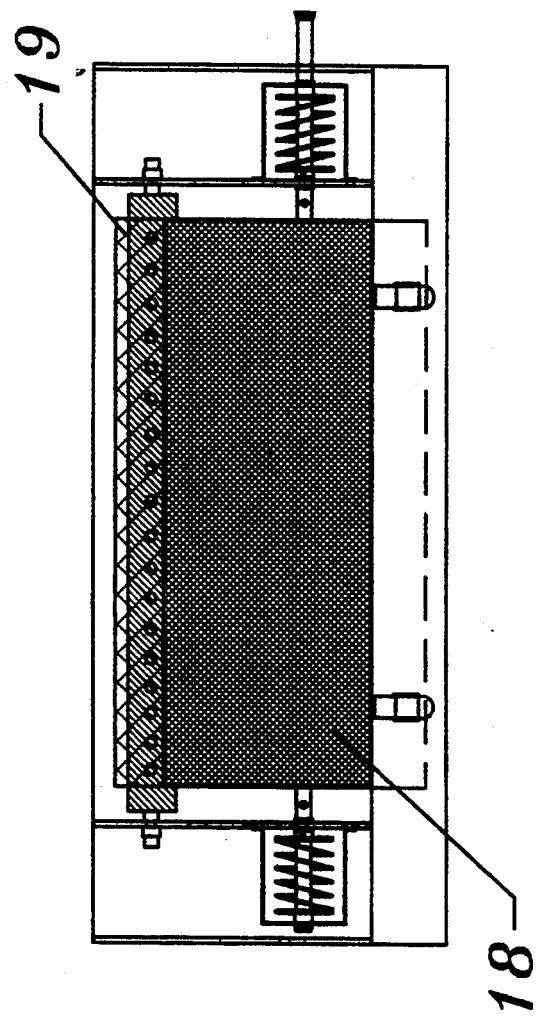
FIG. 2 illustrates the end view of the dispenser spool.
Figure 3:
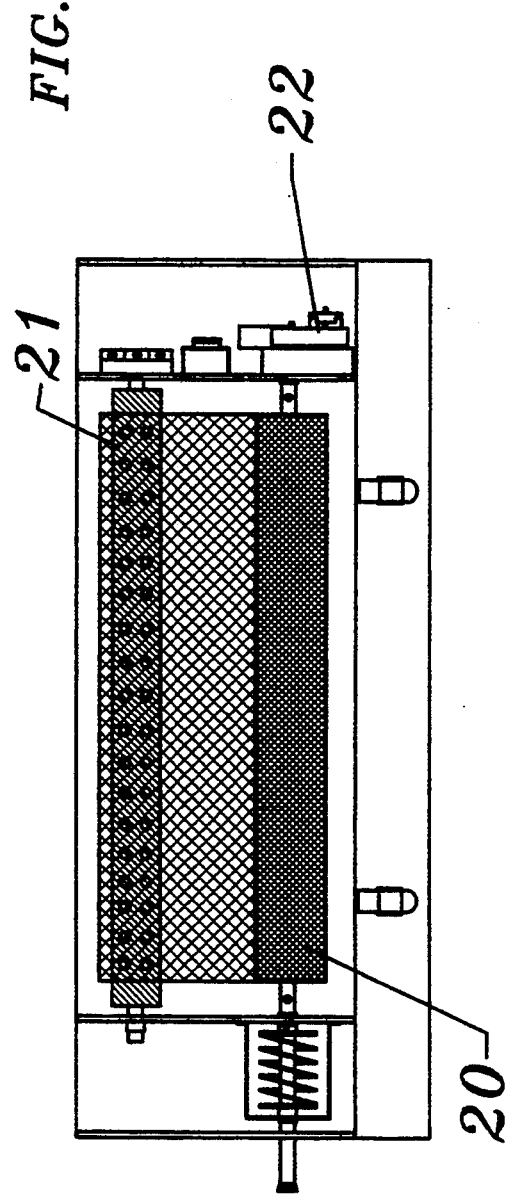
FIG. 3 illustrates the end view of the receiving spool.

Installed on the outer wall of compartment 1 and parallel and adjacent to selected slot 11 is a dispenser type spool 18, FIGS. 1 and 2, having means for support and having rotating means that contain tension springs, for proper rotation, and containing a selected supply of rolled filter material. Installed parallel to said dispenser spool and parallel and adjacent to said slot 11, is idle roller 19, which serves as a guide for the filter material, as it is drawn through the air space between gratings 15 and 16. Installed on the opposite outer wall of compartment 1 and adjacent and parallel to slot 12 is a receiving type spool 20, see FIG. 3, having means for support and having rotating means containing tension springs, for proper rotation, and having motorized means 22 with automatic controls. Installed parallel to said receiving spool and adjacent to said slot 12, is feed roller 21, which serves as a guide for the filter material, as it is drawn through the air space between gratings 15 and 16. Motor 22 serves as a power source for rotating receiver spool 20, that draws the roll filter material from dispenser spool 18, across idle roller 19, through the air space between gratings 15 and 16, across feed roller 21, and onto receiver spool 20. Protective covering 24 is illustrated in FIG. 1 that covers the dispenser spool area and receiving spool area.

At least one selected rigid partition is vertically positioned with its ends connected at selected locations to the inside walls of compartment 2, which forms service compartment 3, (FIGS. 1 and 6), said compartment 3 being selectively sized to accommodate means for electrical wiring and service.

Figure 4:
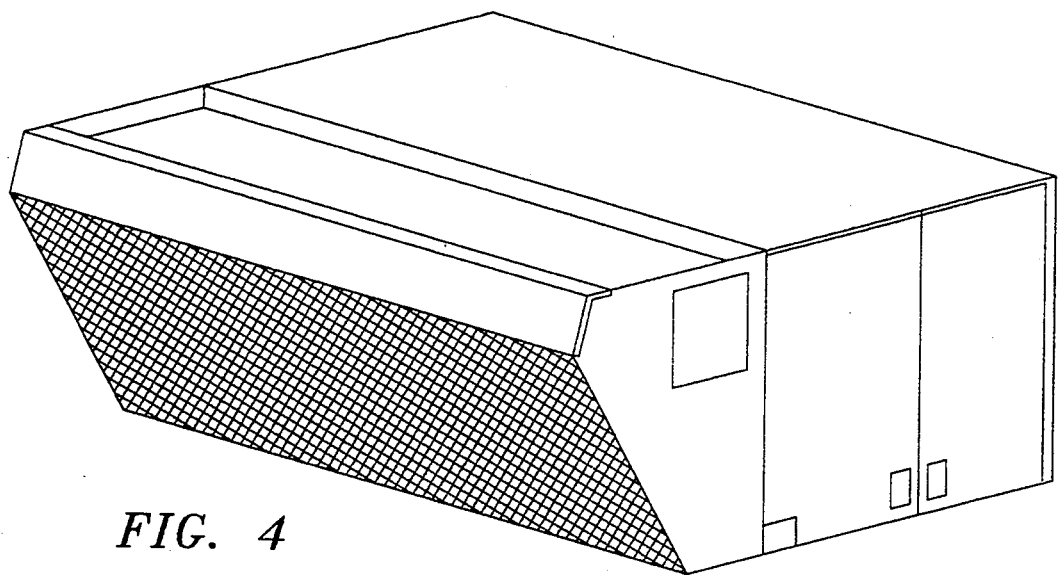
FIG. 4 illustrates a typical rooftop air conditioning unit that is supported by the Auto Filter Curb described herein.
Figure 5:
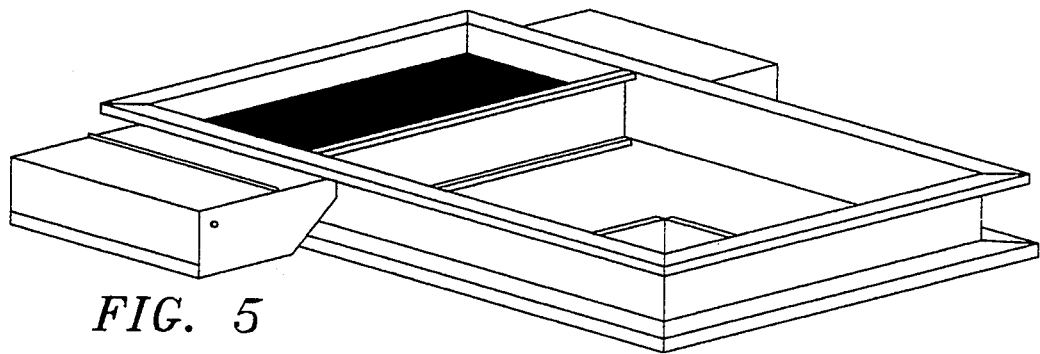
FIG. 5 illustrates the Auto Filter Curb ready to receive the rooftop airconditioning unit.

With a rooftop air conditioning unit, as illustrated in FIG. 4, properly mounted on top of said apparatus, FIG. 5, and connected to its duct system, the power source motor 22, being equipped with selected automatic features, automatically keeps clean filter material rolled into the air space between gratings 15 and 16, which covers the area of compartment 1, and filters all conditioned air that is drawn through the duct system and through said apparatus by the rooftop air conditioner, thus an Auto Filter Curb.

It is to be understood that the foregoing drawings and description of the invention is to be taken as a preferred embodiment and that various other modifications will occur to those skilled in the art upon reading the disclosure, however all changes and modifications that come within the spirit of the invention are desired to be protected.

We claim

1. A method of supporting an airconditioning unit on a rooftop and automatically cleaning the conditioned air that circulates through said unit, comprising the steps of
   a. positioning a selected rectangular shaped rigid partition on its edge with its length positioned horizontally and its width extending up in a vertical position,
   b. positioning at least three other selectively shaped rigid partitions on edge with each having its length selectively positioned horizontally and with each having its width extending up in a vertical position and with each having its ends selectively connected in series with each adjoining selected partition, thus forming a quadrilaterally shaped apparatus,
   c. installing at least one selected rigid partition on its edge and selectively located within said quadrilaterally shaped apparatus, having its length selectively positioned horizontally and its width extending up vertically and having its ends connected at selected locations to the inside walls of said apparatus, thus dividing the apparatus into at least two separate compartments,
   d. constructing a selectively sized service compartment, for electrical wiring and service connections, by installing at least one selected rigid partition on edge in a vertical position and connecting its ends at selected locations to the inside walls of a selected compartment of said apparatus,
   e. installing at least two selectively sized, rectangular, parallel slots, at selected locations, through opposite outer walls of a selected compartment of said apparatus,
   f. installing a selected, rigid grating, of selected mesh and size, to extend from the base of one slot, over the area of said compartment, to the base of the other slot on the opposite outer wall and having means for support,
   g. installing a second selected rigid grating, of selected mesh and size, parallel to and over the area of the first grating, and having means for support that allows selected air space to exist between the two parallel gratings,
   h. installing on the outer wall of said compartment, parallel and adjacent to a selected slot, a dispenser type spool, having means for support and rotating means that contain tension springs, for proper rotation, and containing a selected supply of rolled air filter material,
   i. installing parallel and between said dispenser spool and its adjacent slot, a selected idle roller, having means for support and rotation means, for guiding purposes,
   j. installing on the opposite outer wall of said compartment, parallel and adjacent to the opposite slot, a receiving type spool, having means for support and rotating means that contain tension springs, for proper rotation, and power source means with automatic control for receiving filter material, when activated,
   k. installing parallel and between said receiving spool and its adjacent slot, a selected feed roller, having means for support and rotating means, for guiding purposes,
   l. installing over the idle and feed rollers, through the slots and between the two gratings, in proper series, a portion of the filter material from the dispenser spool, and having means of attaching said filter material to the receiving spool,
   m. installing means for covering the dispenser spool area and means for covering the receiving spool area, for protection,
   n. having means for installing the apparatus on a selected rooftop and supporting a rooftop airconditioning unit, thus automatically cleaning the conditioned air that circulates through said unit, consequently an Auto Filter Curb.

2. An apparatus for supporting an airconditioning unit on a rooftop and automatically cleaning the conditioned air that circulates through said unit, comprising
   a. a selected rectangular shaped rigid partition positioned on its edge with its length positioned horizontally and its width extending up in a vertical position,
   b. at least three other selectively shaped rigid partitions positioned on edge with each having its length selectively positioned horizontally and with each having its width extending up in a vertical position and with each having its ends selectively connected in series with each adjoining selected partition, thus forming a quadrilaterally shaped apparatus,
   c. at least one selected rigid partition installed on its edge and selectively located within said quadrilaterally shaped apparatus, having its length selectively positioned horizontally and its width extending up vertically and having its ends connected at selected locations to the inside walls of said apparatus, thus dividing the apparatus into at least two separate compartments,
   d. a selectively sized service compartment, for electrical wiring and service connections, constructed by installing at least one selected rigid partition on edge in a vertical position and connecting its ends at selected locations to the inside walls of a selected compartment of said apparatus,
   e. at least two selectively sized, rectangular, parallel slots, installed at selected locations, through opposite outer walls of a selected compartment of said apparatus,
   f. a selected rigid grating, of selected mesh and size, installed to extend from the base of one slot, over the area of said compartment, to the base of the other slot on the opposite outer wall and having means for support,
   g. a second selected rigid grating, of selected mesh and size, installed parallel to and over the area of the first grating, and having means for support that allows selected air space to exist between the two parallel gratings,
   h. a dispenser type spool installed on the outer wall of said compartment, parallel and adjacent to a selected slot, having means for support and rotating means that contain tension springs, for proper rotation, and containing a selected supply of rolled air filter material,
   i. a selected idle roller installed parallel and between said dispenser spool and its adjacent slot, having means for support and rotation means, for guiding purposes,
   j. a receiving type spool installed on the opposite outer wall of said compartment, parallel and adjacent to the opposite slot, having means for support and rotating means that contain tension springs, for proper rotation, and power source means with automatic control, for receiving filter material, when activated,
k. a selected feed roller installed parallel and between said receiving spool and its adjacent slot, having means for support and rotating means, for guiding purposes,
l. a portion of the filter material from the dispenser spool installed over the idle and feed rollers, through the slots and between the two gratings, in proper series, and having means of attaching said filter material to the receiving spool,
m. means for covering the dispenser spool area and means for covering the receiving spool area, for protection,
n. means for installing the apparatus on a selected rooftop and supporting a rooftop airconditioning unit, thus automatically cleaning the conditioned air that circulates through said unit, consequently an Auto Filter Curb.

* * * * *